US 6,626,617 B2

(12) United States Patent
Lorber et al.

(10) Patent No.: US 6,626,617 B2
(45) Date of Patent: Sep. 30, 2003

(54) PROCESS FOR THE MILLING OF A GROOVE INTO A BOARD-LIKE WORKPIECE AS WELL AS PROCESSING MACHINE FOR CARRYING OUT THE PROCESS

(75) Inventors: Denis Lorber, Grossbettlingen (DE); Fritz Maiero, Frickenhausen (DE)

(73) Assignee: Reich Spezialmaschinen GmbH, Nuertingen (DE)

( * ) Notice: Subject to any disclaimer, the term of this patent is extended or adjusted under 35 U.S.C. 154(b) by 112 days.

(21) Appl. No.: 09/773,273

(22) Filed: Jan. 31, 2001

(65) Prior Publication Data

US 2001/0026741 A1 Oct. 4, 2001

(30) Foreign Application Priority Data

Feb. 2, 2000 (DE) .......................... 100 04 470

(51) Int. Cl.[7] .............................. B23C 3/28; B23C 1/02; B27B 5/02
(52) U.S. Cl. ...................... 409/132; 409/137; 409/180; 409/206; 83/875; 83/881; 144/136.1; 144/253.3; 144/250.15; 144/252.1; 144/371
(58) Field of Search ................................ 409/180, 178, 409/175, 131–132, 182, 138, 137, 204, 205, 206, 210, 214; 83/875, 887, 881; 144/371, 136.1, 253.3, 145.3, 142, 250.15, 252.1, 137, 144.1, 134.1, 349, 135.3; 30/371, 373, 378

(56) References Cited

U.S. PATENT DOCUMENTS

| 1,361,377 A | * 12/1920 | Forster ................... 144/136.1 |
| 1,615,893 A | * 2/1927 | Wagner .................. 144/145.3 |
| 2,726,690 A | * 12/1955 | Schacher ................. 144/144.1 |
| 4,011,792 A | * 3/1977 | Davis ......................... 409/137 |
| 4,187,046 A | * 2/1980 | Atherton .................... 409/180 |
| 4,584,224 A | * 4/1986 | Schneller .................... 156/45 |
| 4,632,162 A | * 12/1986 | Angeloni ................. 144/253.3 |
| 4,637,775 A | * 1/1987 | Kato .......................... 409/138 |
| 4,669,923 A | * 6/1987 | McKinney ............... 144/145.3 |
| 4,769,201 A | * 9/1988 | Chiuminatta et al. ......... 83/875 |
| 5,044,843 A | * 9/1991 | Velepec ................... 144/145.3 |

FOREIGN PATENT DOCUMENTS

| DE | 3318914 A1 | * 11/1984 |
| DE | 35 21 976 | 3/1986 |
| DE | 195 25 892 | 1/1997 |
| EP | 0146110 A2 | * 6/1985 |
| GB | 2239839 A | * 7/1991 |
| JP | 11-320230 A | * 11/1999 |

OTHER PUBLICATIONS

"foamed plastic", Encyclopedia Britannica, http://www.search.eb.com/eb/article?eu=35346, Aug. 19, 2002.*

(List continued on next page.)

Primary Examiner—A. L. Wellington
Assistant Examiner—Erica E Cadugan
(74) Attorney, Agent, or Firm—Barry R. Lipsitz; Douglas M. McAllister

(57) ABSTRACT

In order to further develop a process for making a groove in a board-like workpiece by means of a processing machine, wherein the workpiece is placed on a supporting table of the processing machine aligned essentially horizontal for holding the workpiece in a machining plane and wherein a milling unit held on a machining head of the processing machine is displaced and a groove is thereby milled into a workpiece by means of a milling disk rotating about a drive shaft aligned parallel to the machining plane, in such a manner that the groove can be milled more precisely with a defined groove depth it is suggested in accordance with the invention that the milling unit be guided at right angles to the machining plane by means of a touch roller associated with the milling disk and adapted to roll on the workpiece. In addition, a processing machine for carrying out the process is suggested as well as the use of the processing machine for the milling of a groove into a multilayered or composite material board.

10 Claims, 3 Drawing Sheets

OTHER PUBLICATIONS

Figure 1:
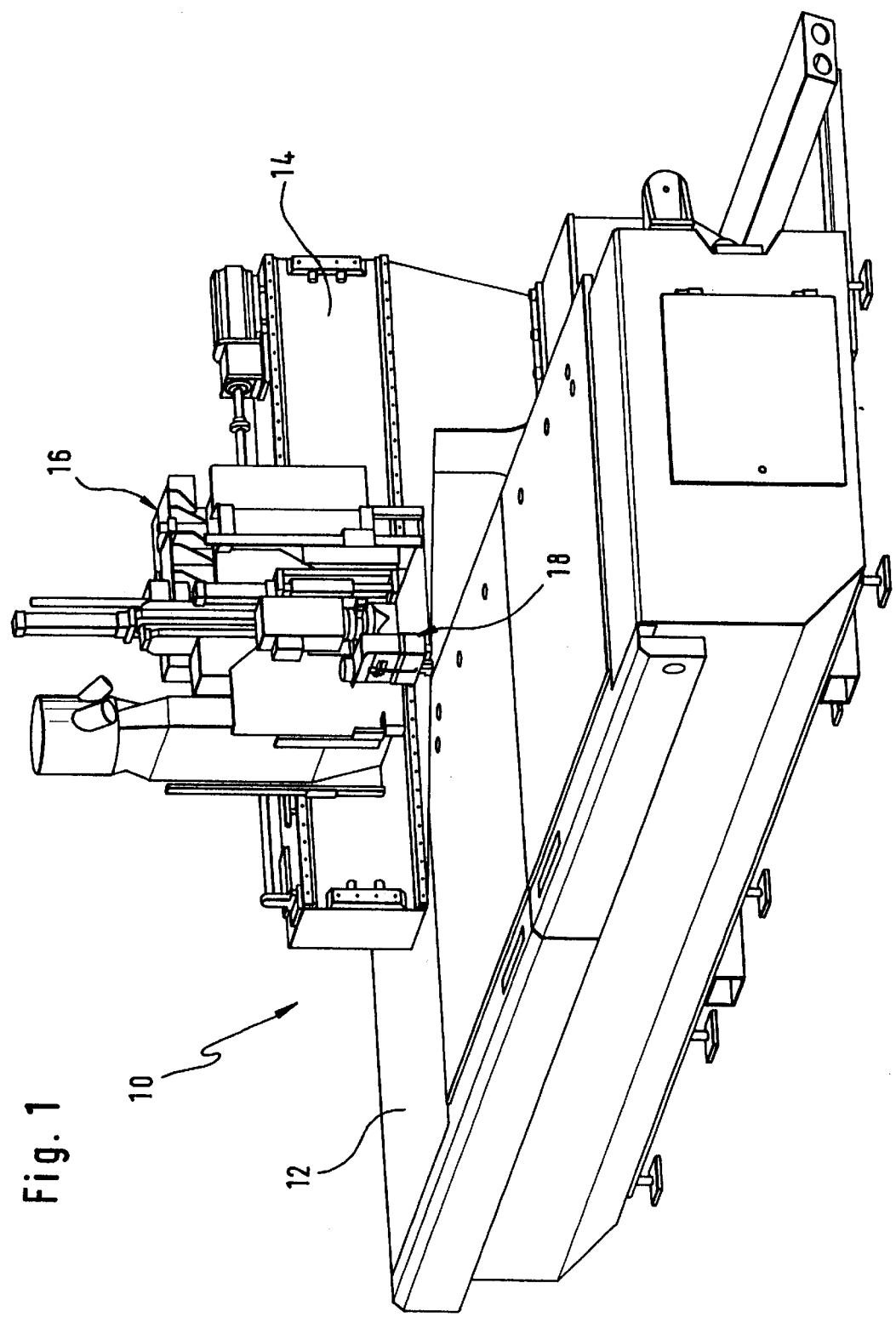

Brochure of REICH Spezialmaschinen GmbH entitled "ALUCOBOND", Aug. 1999 (4 pages).

Brochure of REICH Spezialmaschinen GmbH entitled "ALUCOBOND", Apr. 2001 (4 pages).

Brochure of REICH Spezialmaschinen GmbH entitled "UNI–MASTER", Apr. 1999 (6 pages).

*Patent Abstracts of Japan*, Abstract of Japanese Patent "Grooving Tool", Publication No. 08229724, Sep. 10, 1996, Japanese Application No. 07033761, Filed Feb. 22, 1995.

* cited by examiner

PROCESS FOR THE MILLING OF A GROOVE INTO A BOARD-LIKE WORKPIECE AS WELL AS PROCESSING MACHINE FOR CARRYING OUT THE PROCESS

The present disclosure relates to the subject matter disclosed in German Application No. 100 04 470.0 of Feb. 2, 2000, the entire specification of which is incorporated herein by reference.

The invention relates to a process for the milling of a groove into a board-like workpiece by means of a processing machine, wherein the workpiece is placed on a supporting table of the processing machine aligned essentially horizontal for holding the workpiece in a machining plane and wherein a milling unit held on a machining head of the processing machine is displaced and a groove is thereby milled into the workpiece by means of a milling disk rotating about a drive shaft aligned parallel to the machining plane.

The invention relates, in addition, to a processing machine for carrying out the process with a supporting table for holding a board-like workpiece in an essentially horizontal machining plane and with a machining head which can be displaced parallel to the machining plane and on which a milling unit is held, wherein the milling unit comprises a milling disk rotatable about a drive shaft aligned parallel to the machining plane for milling a groove into the workpiece.

Processing machines for the horizontal machining of board-like workpieces, in particular, for the machining of wood or plastic or composite boards or panels enables predetermined grooves to be introduced into the workpiece within a short time with a high reproduction capability. The processing machines are mostly designed as computer-controlled machining centers and comprise a machining head, on which several machining units, for example, drilling and milling units are held. In this respect, milling units with a milling disk, which rotates about a drive shaft aligned parallel to the machining plane, can be used for the milling of V-shaped or U-shaped grooves. The milling unit is held at a predeterminable distance in relation to the workpiece to be machined and displaced parallel to the machining plane in a computer-controlled manner.

In order to be able to make a groove with a constant groove depth in this manner it is necessary for the upper side of the workpiece to be machined, which faces the milling disk, to be aligned exactly parallel to the advancing direction of the milling disk. For this purpose, considerable attempts have been made with conventional processing machines to align the supporting table and the advancing direction of the machining head and of the milling disk exactly parallel to one another. It has, however, been shown that despite such an alignment grooves with a groove depth remaining constant in the advancing direction cannot, in all cases, be milled into board-like workpieces.

The object of the present invention is to make a process of the type described at the outset available which makes the more precise milling of a groove into a board-like workpiece with a defined groove depth possible.

This object is accomplished in accordance with the invention, in a process of the generic type, in that the milling unit is guided at right angles to the direction of machining by means of a touch roller associated with the milling disk and adapted to roll on the workpiece. With such a procedure, the distance of the milling unit to the workpiece transversely to the machining plane is defined by the touch roller which rolls on the upper side of the workpiece facing the milling unit. For this purpose, the milling unit is held on the machining head so as to be displaceable transversely to the machining plane, i.e. its distance to the machining plane is not rigidly specified but rather is dependent on the positioning of the touch roller and thus on the path of the upper side of the workpiece to be machined. Any non-parallelisms between the upper side of the workpiece and the guidance of the milling unit can thus be reliably prevented. This makes the extremely precise milling of a groove with a defined groove depth possible, which has an effect, in particular, for the machining of multilayered or composite boards which are intended to be deformed after the groove has been made. Multilayered boards normally comprise a center layer consisting of a plastic or a material on a mineral basis which is difficult to bend, i.e. can be bent only with a large bending radius, the center layer being covered on its upper side and its lower side by a mostly metallic cover layer capable of bending. Multilayered boards of this type may be folded "by hand" in a simple manner in that a V-shaped or rectangular groove is milled first of all along the bending edge by means of a form cutter, wherein after the groove has been made the remaining material has only a very slight thickness of, for example, 0.8±0.1 mm. Subsequently, the multilayered board can be folded by hand without a folding machine or the like being required for this purpose. A precondition for this is, however, that the depth of the groove is maintained very precisely over the entire length of the groove. The same applies for boards or panels consisting of a composite material, for example, of a plastic material, with which mineral substances have been mixed. Composite materials of this type are likewise very hard to bend, wherein only large bending radii can be achieved. Even small bending radii can, however, be achieved when the composite boards are provided first of all with a very precise groove, as has already been explained above in the case of multilayered boards.

It is of advantage when chips located immediately in front of the touch roller in the advancing direction of the milling unit are removed from the contact area of the touch roller by means of an air nozzle. In this way, chips located on the upper side of the workpiece can be reliably prevented from influencing the positioning of the touch roller rolling on the upper side of the workpiece and thus of the milling disk. A particularly precise groove can be milled in a reproducible manner as a result of the chips being removed.

The removal of the chips can take place in that these are drawn off by means of a suction unit. A procedure has proven to be particularly reliable, with which the chips are removed by means of a blast nozzle, i.e. they are blown away from the contact area of the touch roller by means of a flow of air. In this respect, it is particularly favorable when the chips blown away are subsequently drawn off by suction.

The object underlying the invention is, in addition, to make a processing machine of the type specified at the outset available for carrying out the process.

This object is accomplished in a processing machine of the generic type in that the milling unit is held on the machining head so as to be continuously displaceable at right angles to the machining plane during the introduction of a groove and that a touch roller which can roll on the workpiece is associated with the milling disk for guiding the milling unit, wherein the milling disk projects beyond the edge of the touch roller by the depth of the groove in the contact area of the touch roller on the workpiece.

With a processing machine of this type the milling unit can be displaced by means of conventional drive elements parallel to the machining plane along predeterminable coordinates. The positioning of the milling unit at right angles to the machining plane is predetermined by the touch roller rolling on the workpiece and so the milling unit can be displaced at a very precise distance in relation to the upper side of the workpiece.

As the milling disk projects beyond the touch roller, the depth of the groove is predetermined precisely by the distance of the outer edge of the milling disk from the corresponding edge of the touch roller.

It is favorable when the projection of the milling disk beyond the edge of the touch roller in the contact area of the touch roller on the workpiece can be adjusted. This makes the use of a touch roller for different groove depths possible in that the distance of the touch roller in the contact area on the workpiece from the outer edge of the milling disk can be adjusted accordingly.

In a particularly preferred development of the processing machine it is provided for the touch roller to comprise a freely rotatable touch ring which can be abutted on the workpiece and is held so as to be adjustable transversely to the drive shaft of the milling disk. The positioning of the axis of rotation of the touch roller relative to the position of the drive shaft of the milling disk can thus be altered transversely to the machining plane. This makes it possible to alter the projection of the outer edge of the milling disk in relation to the edge of the touch roller in the contact area of the touch roller on the workpiece in a simple manner. If the milling disk is reground so that its diameter is changed, the distance of the outer edge of the milling disk in relation to the touch roller can be readjusted in that the touch ring is repositioned accordingly relative to the milling disk. Such a repositioning makes possible, in addition, an adjustment of the depth of the groove to workpiece thickness tolerances.

In order to achieve a particularly precise groove depth, it is of advantage when the milling unit comprises an air nozzle directed onto the contact area of the touch roller on the workpiece. A flow of air can be generated by means of the air nozzle in the contact area of the touch roller on the workpiece for removing chips resting on the upper side of the workpiece.

In this respect, it is particularly favorable when the air nozzle is designed as a blast nozzle which can be connected to a source of compressed air via a pressure line.

In a particularly preferred development of the inventive processing machine it is provided for the milling unit to comprise a suction hood which surrounds the milling disk and the touch roller and is in flow communication with a suction unit via a suction line.

Chips resulting during milling can thus be drawn off reliably. In this respect, it is particularly favorable when the suction hood surrounds the mouth area of the blast nozzle. Resulting chips can be removed from the contact area of the touch roller by means of the blast nozzle, wherein it is ensured at the same time on account of the suction nozzle that these are subsequently drawn off via the suction line.

As already explained above, the processing machine is suitable, in particular, for the precise milling of a preferably V-shaped or U-shaped groove into a multilayered board which comprises at least two layers with different bending stiffnesses or also into boards consisting of composite materials. In the case of multilayered boards, a groove can be milled into the layer more resistant to bending so that, subsequently, the multilayered board can be deformed by hand in the area of the layer having a lesser bending stiffness. Multilayered boards suitable for this purpose have, in particular, an intermediate layer and cover layers which cover the upper and lower sides of the intermediate layer, wherein the intermediate layer has a greater bending stiffness than the cover layers. It may, for example, be provided for the intermediate layer to be manufactured from a plastic material or a material on a mineral basis. A metal layer, in particular, an aluminum layer can preferably be used for the cover layer.

Figure 2:
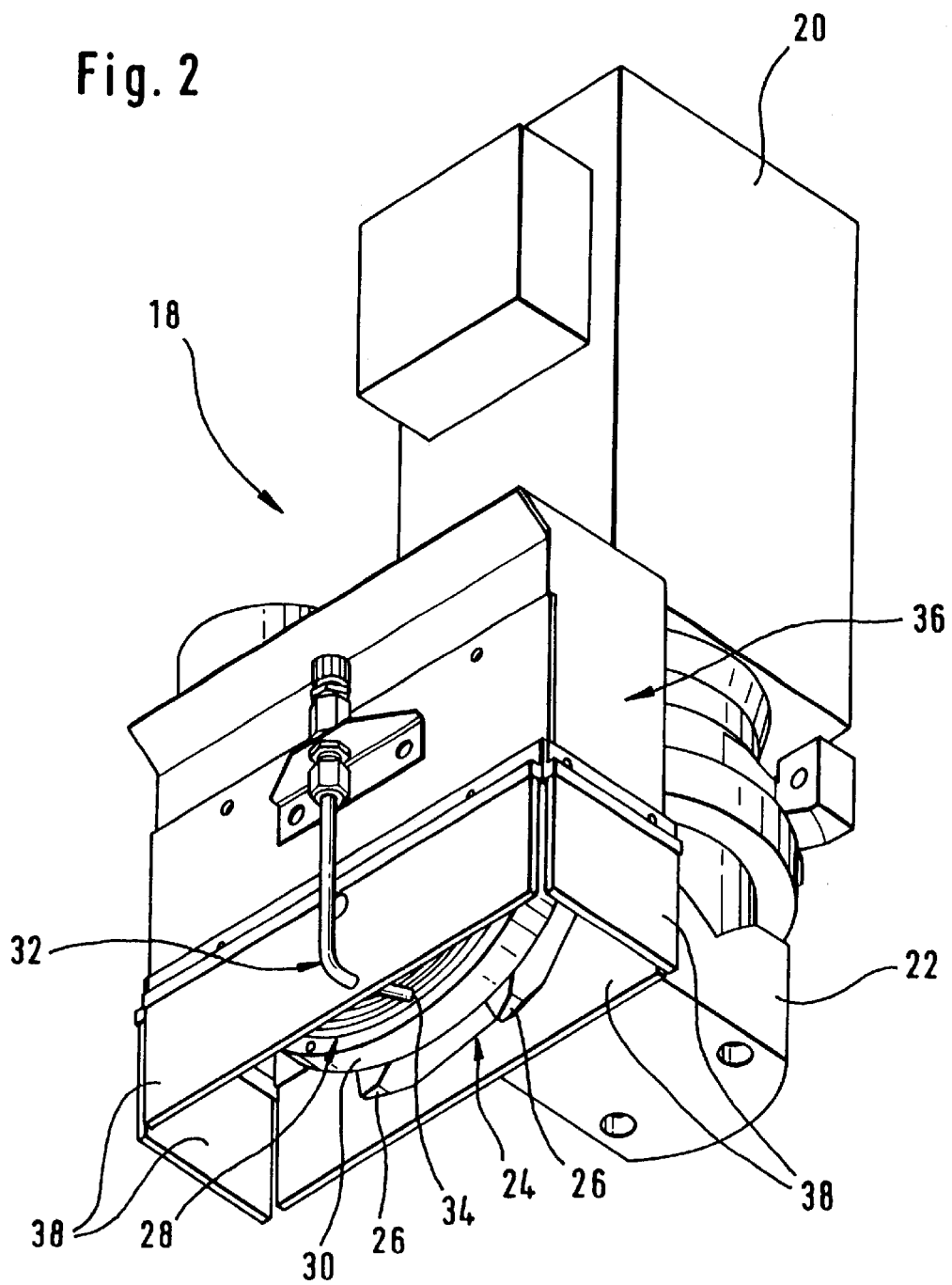

The following description of a preferred embodiment of the invention serves to explain the invention in greater detail in conjunction with the drawings. These show:

FIG. 1: a schematic, diagrammatic illustration of a processing machine with a milling unit;

FIG. 2: a schematic, diagrammatic view of the milling unit at an angle from below; and FIG. 3: a schematic, diagrammatic view of the milling unit at an angle from above.

In FIG. 1, a processing machine designated altogether with the reference numeral 10 is illustrated in a schematic illustration for the horizontal machining of board-like workpieces. Processing machines of this type are used, in particular, in the form of so-called CNC machining centers which allow a reproducible machining, for example, of wood or plastic boards.

The processing machine 10 comprises a supporting table 12, on which the workpiece to be machined can be aligned in a horizontal machining plane. The workpiece can be fixed reliably on the supporting table 12 by means of clamping devices known per se, for example, by means of vacuum suction devices not illustrated in the drawing.

An arm 14, which bears a machining head 16 displaceable in the transverse direction of the supporting table 12, is held on the supporting table 12 so as to be displaceable in its longitudinal direction. A milling unit 18 illustrated on a larger scale in FIGS. 2 and 3 is held on the machining head 16 transversely to the machining plane defined by the supporting table 12.

The processing machine 10 comprises a programmable control unit which is known per se but not illustrated in the drawings as well as drive units for displacing the arm 14 and the machining head 16 so that the milling unit 18 can be displaced parallel to the machining plane along predeterminable coordinates.

Figure 3:
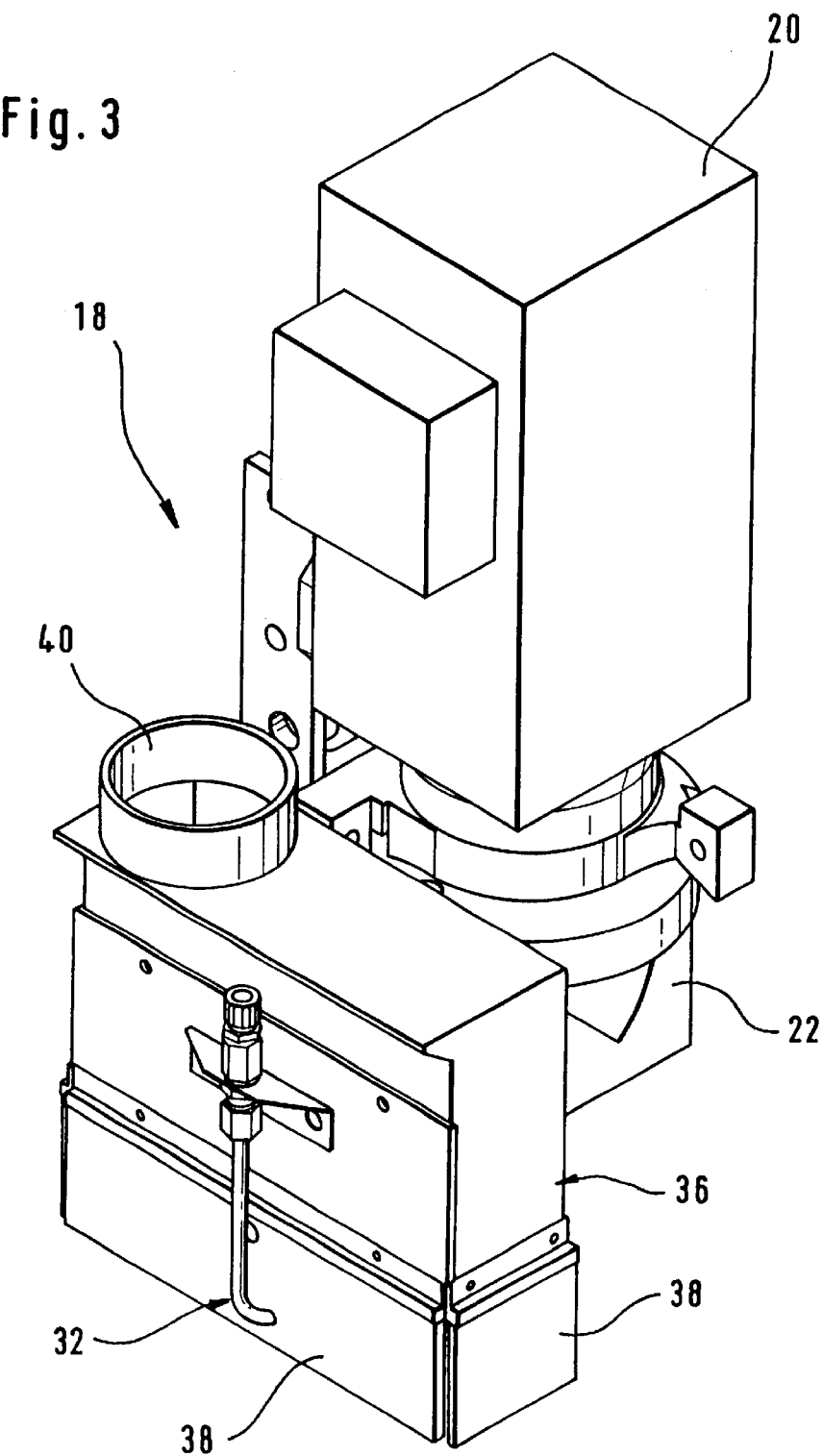

As becomes clear, in particular, from FIGS. 2 and 3, the milling unit 18 comprises a drive motor 20 which can be controlled by the control unit and the motor shaft of which is aligned at right angles to the machining plane.

A drive shaft for a milling disk 24 aligned parallel to the machining plane is coupled to the motor shaft via a deflection gearing 22 and the milling disk is detachably held on the free end of the drive shaft facing away from the deflection gearing 22. The milling disk 24 comprises in the known manner several cutters 26 arranged so as to be distributed uniformly around its circumference.

A touch roller 28 is detachably held on the free end of the drive shaft facing away from the deflection gearing 22 in addition to the milling disk 24 and aligned parallel to it. This roller comprises in its radially outer area a touch ring 30 which is freely rotatable about an axis of rotation aligned parallel to the drive shaft of the milling disk 24 and is held so as to be adjustable transversely to the machining plane.

In order to machine a workpiece lying on the supporting table 12, the milling unit 18 can be displaced downwards in the direction towards the supporting table 12 to such an extent that the touch ring 30 rests on the upper side of the workpiece facing the milling unit 18. Subsequently, the milling unit 18 can be displaced parallel to the machining plane for milling a groove. In this respect, the freely rotatable touch ring 30 rolls along the upper side of the workpiece. As the milling unit 18 is held on the machining head 16 so as to be freely displaceable transversely to the machining plane, the position of the milling disk 24 relative to the workpiece to be machined is predetermined by the position of the touch ring 30. The position of the touch ring 30 in relation to the milling disk 24 is adjusted in such a manner that the cutters 26 project by the desired groove depth in a radial direction in the contact area of the touch ring 30 on the workpiece to be machined. Even with an alignment of the upper side of the workpiece deviating from the machining plane predetermined by the supporting table 12, a constant groove depth is thus ensured over the entire length of the groove to be milled since the positioning of the milling disk 24 is not predetermined in the direction at right angles to the machining plane by the position of the machining head 16 but rather by the touch ring 30 rolling on the upper side of the workpiece.

In order to ensure that the positioning of the touch ring 30 is not influenced by chips lying on the upper side of the workpiece, the milling unit 18 comprises a blast nozzle 32, the mouth area 34 of which is arranged immediately adjacent to the contact area of the touch ring 30 on the workpiece to be machined, i.e. to the underside of the touch ring 30 facing the supporting table 12. The blast nozzle 32 may be connected to a source of compressed air via a pressure line, for example, a pressure hose not illustrated in the drawings.

The mouth area 34 of the blast nozzle 32, in the same way as the touch roller 28 and the milling disk 24, is surrounded by a suction hood 36 open on one side in the direction towards the supporting table 12. The lower edge of the suction hood 36 is defined by brushes 38 which are of a flexible design in order to prevent any damage to the upper side of the workpiece.

On its upper side facing away from the supporting table 12 the suction hood 36 bears a short connection pipe 40, to which a flexible suction line can be connected which is known per se and therefore omitted in the drawings for reasons of better clarity and which is in flow communication with a suction unit likewise not illustrated in the drawings. Chips resulting during milling can thus be removed by means of the blast nozzle 32 from the contact area of the touch ring 30 on the workpiece and, subsequently, be drawn off via the suction hood 36 and the suction line connected thereto.

Grooves with a very precise groove depth can be milled by means of the processing machine 10, in particular, into multilayered boards with a core consisting of plastic or a material on a mineral basis and with aluminum cover layers in such a manner that on one side of the multilayered boards the aluminum cover layer together with a very small portion of the plastic core remain. The slight thickness of the remaining material then makes a folding "by hand" possible. A folding machine is not required. The bending radius is determined by the shape of the groove. In this respect, a V-shaped groove can be used, in particular, with groove flanks preferably aligned relative to one another at an angle of 90° or 135° or also a rectangular groove. The processing machine 10 is also suitable in a corresponding manner for the milling of composite material boards, for example, boards consisting of plastic, with which a mineral substance has been mixed, in particular, powdered stone. Composite materials of this type may likewise be normally folded only with a large bending radius. However, if they are—as explained above—provided with a groove with a precise groove depth, even small bending radii can be achieved by folding "by hand".

What is claimed is:

1. A process for the milling of a groove into a workpiece by means of a processing machine, wherein:

the workpiece is placed on a supporting table of the processing machine, said supporting table being arranged essentially horizontally for holding said workpiece in a horizontal machining plane, a milling unit held on a machining head of the processing machine is displaced and a groove is thereby milled into the workpiece by means of a milling disk rotating about a drive shaft aligned parallel to the machining plane, the milling unit is held on the machining head so as to be continuously displaceable relative thereto at right angles to the machining plane during introduction of the groove by means of a touch roller associated with the milling disk and adapted to roll on the workpiece.

2. A process as defined in claim 1, wherein chips located immediately in front of the touch roller in an advancing direction of the milling unit are removed from a contact area of the touch roller by means of an air nozzle.

3. A process as defined in claim 2, wherein a blast nozzle is used to remove the chips.

4. A processing machine for milling a groove into a workpiece, comprising:

a supporting table for holding said workpiece in an essentially horizontal machining plane, a machining head displaceable parallel to the machining plane, and a milling unit held on said head, wherein:

the milling unit comprises a milling disk rotatable about a drive shaft aligned parallel to the machining plane for milling the groove into the workpiece, the milling unit is held on the machining head so as to be continuously displaceable relative thereto at right angles to the machining plane during the introduction of the groove by means of a touch roller adapted to roll on the workpiece and associated with the milling disk for guiding the milling unit, and the milling disk projects beyond an edge of the touch roller by the depth of the groove in a contact area of the touch roller on the workpiece.

5. A processing machine as defined in claim 4, wherein the projection of the milling disk beyond the edge of the touch roller in the contact area of the touch roller on the workpiece is adjustable.

6. A processing machine as defined in claim 5, the touch roller comprises a rotatable touch ring adapted to abut on the workpiece, said ring being held so as to be adjustable transversely to the drive shaft of the milling disk.

7. A processing machine as defined in claim 4, wherein the milling unit comprises an air nozzle directed onto the contact area of the touch roller on the workpiece.

8. A processing machine as defined in claim 7, wherein the air nozzle comprises a blast nozzle adapted to be connected to a source of compressed air via a pressure line.

9. A processing machine as defined in claim 4, wherein the milling unit comprises a suction hood surrounding the milling disk and the touch roller, said hood being in flow communication with a suction unit via a suction line.

10. A processing machine as defined in claim 9, wherein the suction hood surrounds a mouth area of a blast nozzle.

* * * * *